United States Patent [19]

Royer

[11] Patent Number: 5,506,869
[45] Date of Patent: Apr. 9, 1996

[54] METHODS AND APPARATUS FOR ESTIMATING CARRIER-TO-INTERFERENCE RATIOS AT CELLULAR RADIO BASE STATIONS

[75] Inventor: Claude Royer, Hull, Canada

[73] Assignee: Northern Telecom Limited, Quebec, Canada

[21] Appl. No.: 329,922

[22] Filed: Oct. 27, 1994

[51] Int. Cl.$^6$ ............................................. H04B 3/46
[52] U.S. Cl. .............................. 375/224; 379/60; 379/63; 455/67.3; 455/226.3; 455/33.1; 455/33.2; 455/67.4; 455/69
[58] Field of Search ........................... 375/224; 379/58, 379/59, 60, 63; 455/33.1, 33.2, 53.1, 54.1, 56.1, 67.1, 67.3–67.4, 69, 226.3, 63

[56] References Cited

U.S. PATENT DOCUMENTS 5,175,867 12/1992 Wejke et al. ........................ 455/33.1
5,247,699 9/1993 Hartman ............................. 455/33.1
5,293,641 3/1994 Kallin et al. ........................ 455/33.1
5,406,588 4/1995 Birchler et al. ..................... 375/346

Primary Examiner—Stephen Chin
Assistant Examiner—Huong Luu
Attorney, Agent, or Firm—C. W. Junkin

[57] ABSTRACT

In methods and apparatus for estimating carrier-to-interference ratios of signals transmitted between cellular radio base stations and mobile units, a SAT signal is transmitted from a base station to a mobile unit served by that base station. The mobile unit receives the SAT signal and retransmits the received SAT signal to the base station. A first order autoregressive parameter is calculated for the received SAT signal at the base station is correlated with a tabulated carrier-to-interference ratio estimate to estimate the carrier-to-interference ratio of the signals.

16 Claims, 3 Drawing Sheets 5,506,869

METHODS AND APPARATUS FOR ESTIMATING CARRIER-TO-INTERFERENCE RATIOS AT CELLULAR RADIO BASE STATIONS

FIELD OF INVENTION

This invention relates to methods and apparatus for estimating carrier-to-interference ratios at cellular radio base stations.

BACKGROUND OF INVENTION

Cellular radio systems comprise a plurality of base stations connected to a switched telecommunications network and a plurality of mobile units. Mobile units are connected to the telecommunications network by establishing radio links with nearby base stations. As mobile units travel from an area served by a first base station to an area served by a second base station, the radio link between the mobile unit and the first base station must be replaced by a radio link between the mobile unit and the second base station to maintain communications between the mobile unit and the telecommunications network. This operation is generally called a "hand-off" of the mobile unit from the first base station to the second base station.

Hand-off operations are triggered when the base station currently linked to a mobile unit detects degradation of radio signals received from that mobile unit. Consequently, base stations must monitor the quality of signals received from mobile units. One useful measure of signal quality is the carrier-to-interference ratio of the received signals.

Each base station receives radio signals from all mobile units which are operating within its receiving range. As this receiving range overlaps with serving areas of neighboring base stations, the base stations must be able to distinguish signals received from those mobile units they are currently serving from signals received from mobile units served by neighboring base stations. To this end, each base station transmits an out-of-band Supervisory Audio Tone (SAT) to each of the mobile units it is currently serving, and each mobile unit retransmits the SAT for reception by the base stations. As adjacent base stations are assigned distinct SATs, each base station can recognize signals intended for its reception by the presence of its distinctive SAT in those signals.

SUMMARY OF INVENTION

An object of this invention is to provide methods and apparatus for estimating carrier-to-interference ratios at cellular radio base stations. The resulting carrier-to-interference ratio estimates may form a suitable basis for deciding when to hand-off mobile units from one base station to adjacent base stations.

One aspect of this invention provides a method for estimating carrier-to-interference ratios for signals transmitted between base stations and mobile units. The method comprises transmitting a SAT signal from a base station to a mobile unit served by that base station, receiving the SAT signal at the mobile unit, retransmitting the received SAT signal at the mobile unit and receiving the retransmitted SAT signal at the base station. The method further comprises calculating a first order autoregressive parameter for the received SAT signal at the base station, and correlating the first order autoregressive parameter with a tabulated carrier-to-interference ratio estimate to estimate the carrier-to-interference ratio of the signals.

Another aspect of this invention provides apparatus for estimating carrier-to-interference ratios for signals transmitted between base stations and mobile units. The apparatus comprises a signal processor for calculating a first order autoregressive parameter for a received SAT signal at the base station, and a database for correlating the first order autoregressive parameter with a tabulated carrier-to-interference ratio estimate to estimate the carrier-to-interference ratio of the signals.

BRIEF DESCRIPTION OF DRAWINGS

Embodiments of the invention are described below by way of example only. Reference is made to accompanying drawings in which.

DETAILED DESCRIPTION

Figure 1:
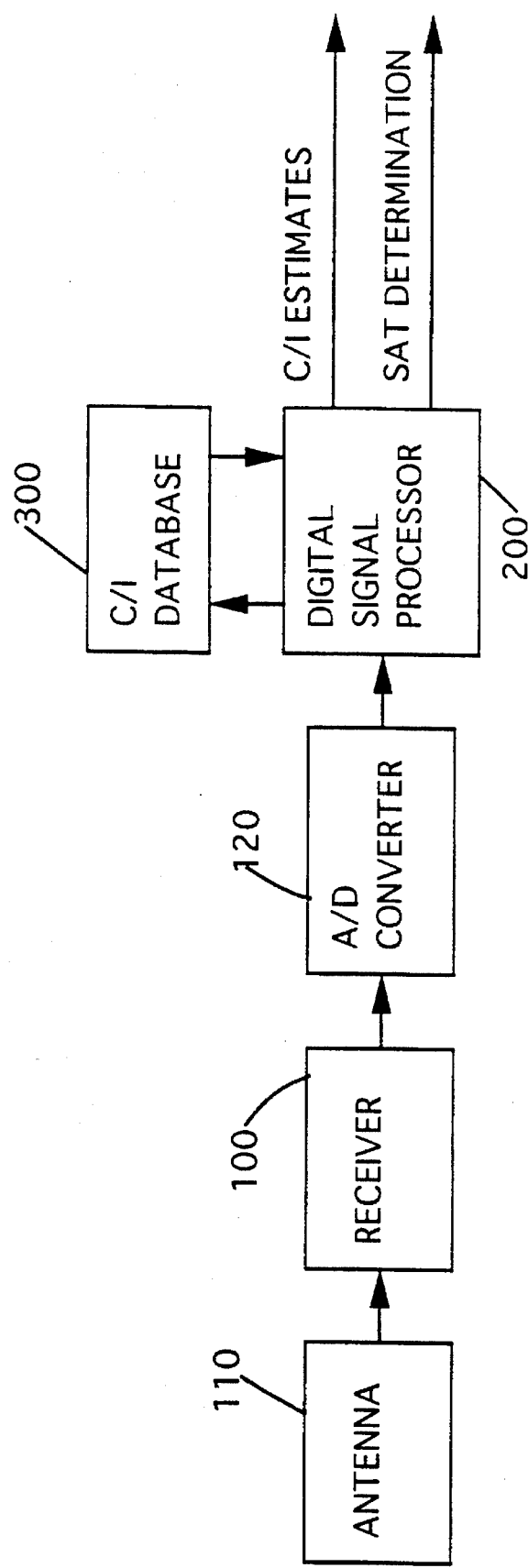
FIG. 1 is a block schematic diagram of base station subsystems for receiving radio signals from mobile units and for estimating carrier-to-interference ratios of the received signals.

A cellular radio base station comprises subsystems as shown in FIG. 1 for receiving signals from mobile units and for estimating carrier-to-interference ratios of the received signals. These subsystems include a radio receiver 100 and an antenna 110 for coupling radio signals to the receiver 100. The subsystems further comprise an analog-to-digital converter 120 for converting received analog radio signals to a sequence of digitally encoded samples r(n) having a sampling rate of 48,600 samples per second. The subsystems further comprise a digital signal processor 200 which operates in cooperation with a carrier-to-interference database 300 to estimate carrier-to-interference ratios of the received signals, and to determine which Supervisory Audio Tones (SATs) are carried in the received signals.

Figure 2:
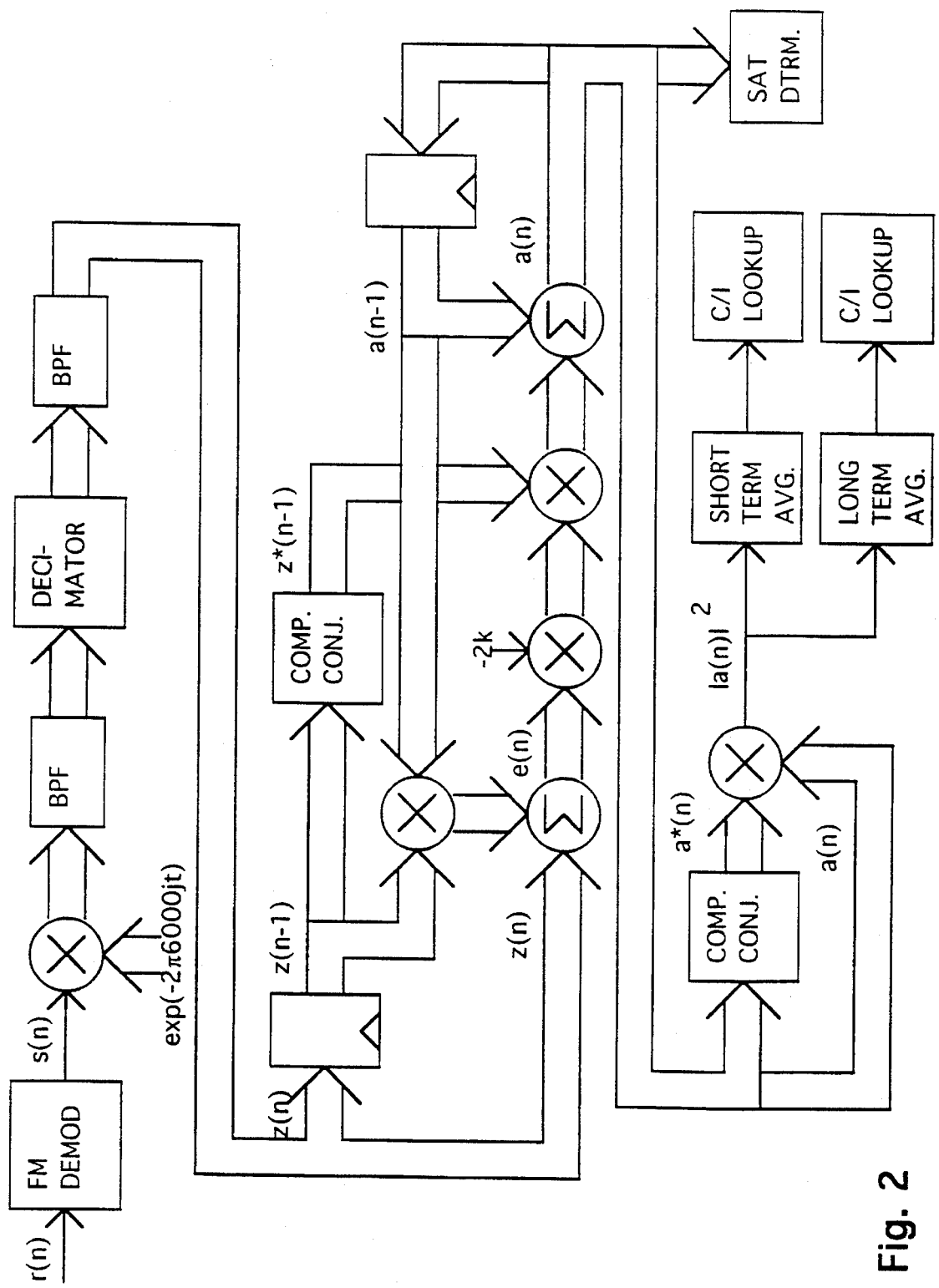
FIG. 2 is a block schematic diagram illustrating functions performed by a digital signal processing subsystem of FIG. 1 to estimate carrier-to-interference ratios.

FIG. 2 is a block schematic diagram illustrating functions performed by the digital signal processor 200 to estimate the carrier-to-interference ratios of the received signals. These functions are implemented in firmware or software which is stored in a memory of the digital signal processor 200 and which run on a microprocessor of the digital signal processor 200.

Figure 3:
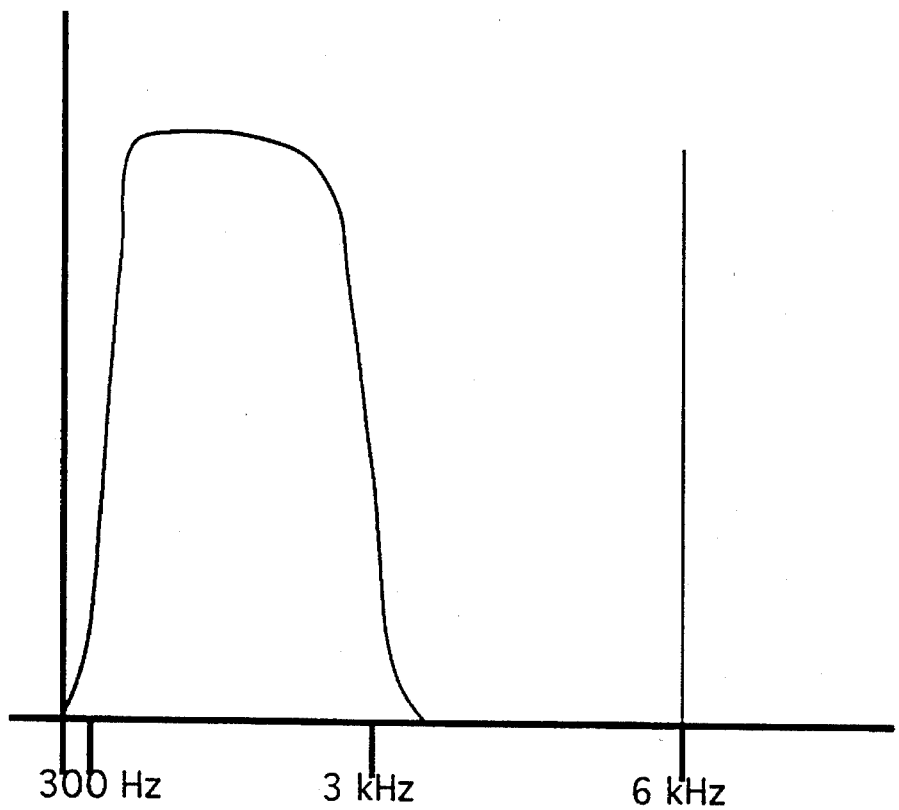
FIG. 3 is a plot illustrating a signal spectrum of radio signals after FM demodulation by the digital signal processing subsystem.

The digital signal processor 200 demodulates the received digital signal r(n) using conventional digital FM demodulation techniques to produce a real-valued sequence s(n) having a frequency spectrum essentially as illustrated in FIG. 3. In particular, the demodulated digital signal s(n) has a voice band component between approximately 300 Hz and 3 kHz and a SAT component within a 100 Hz band centered at approximately 6 kHz.

The digital signal processor 200 multiplies the real-valued sample sequence s(n) by $\exp(-j2\pi 6000t)$ to derive a complex-valued sample sequence having a SAT component at approximately −30 Hz, 0 Hz or +30 Hz, bandpass filters the complex-valued sample sequence to reject spectral components outside a −50 Hz to +50 Hz band containing the SAT component, decimates the resulting complex-valued sample sequence to reduce the sample rate to 120 samples per second, and bandpass filters the resulting complex-valued sample sequence to compensate for roll-off at edges of the −50 Hz to +50 Hz passband of the previous bandpass filtering operation.

The digital signal processor 200 uses the resulting complex-valued sample sequence z(n) to compute a sequence a(n) of complex-valued first order autoregressive parameters given by:

$$a(n)=a(n-1)-2k\,e(n)z^*(n-1)$$

where e(n) is a sequence of complex-valued filter residuals given by:

$$e(n)=z(n)+a(n-1)z(n-1)$$

and k is a real-valued constant equal to the iteration step size.

The initial value a(1) in the sequence a(n) of complex-valued first order autoregressive parameters for each sequence r(n) of received signal samples is set according to the SAT frequency of the base station as follows:

| SAT Frequency | a(1) |
| --- | --- |
| 5970 Hz | −j |
| 6000 Hz | 1 |
| 6030 Hz | +j |

Figure 4:
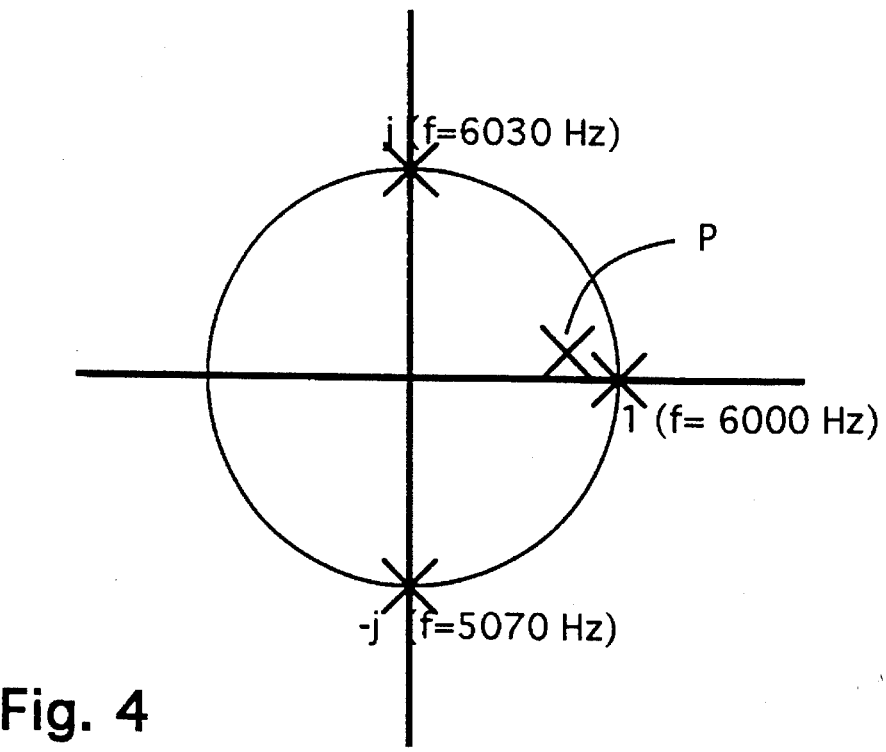
FIG. 4 is a plot on the complex plane illustrating the values of carrier-to-interference indices calculated by the digital signal processing subsystem for different carrier-to-interference ratios and SAT frequencies.

It can be shown that for an ideal system in which the received signal has a SAT component exactly equal to one of the nominal SAT frequencies and in which there is no interference in the SAT band, the sequence a(n) of first order autoregressive parameters will converge to a complex-value located in the complex plane at an intersection of a unit circle and an axis of the complex plane, as shown in FIG. 4. Deviations of the SAT component from the nominal SAT frequency will cause the sequence a(n) of first order autoregressive parameters to converge to a value which is displaced from the axis of the complex plane along the unit circle. Interference in the SAT band will cause the sequence a(n) of first order autoregressive parameters to converge to a value which is displaced from the unit circle along the axis of the complex plane toward the origin. In real systems, the combined effect of deviations of the SAT component from nominal SAT frequencies and interference cause the sequence a(n) of first order autoregressive parameters to converge to a value which is displaced both from the axes of the complex plane and from the unit circle. For example, a SAT component at approximately 6005 Hz having a carrier-to-interference ratio of approximately 12 dB may have a first order autoregressive parameter located in the complex plane as shown at P in FIG. 4.

The digital signal processor 200 computes the squared magnitude $|a(n)|^2$ of the first order autoregressive parameter a(n), and averages the squared magnitude $|a(n)|^2$ over both a short time interval and a long time interval to derive real-valued short term and long term carrier-to-interference indices. (Both interval lengths are adjustable. The short interval length is typically set to approximately 2 seconds and the long interval length is typically set to 10 seconds.)

The carrier-to-interference database 300 includes files containing carrier-to-interference ratio estimates and corresponding carrier-to-interference indices. The correspondence between the carrier-to-interference indices and the carrier-to-interference ratio estimates was established during development of the carrier-to-interference database 300 by applying the processing described above to input signals having known carrier to interference ratios to determine the squared magnitude $|a|^2$ of the resulting first order autoregressive parameter. The carrier-to-interference ratio of the input signals was incremented through approximately 30 steps of approximately 0.5 dB to generate corresponding carrier-to-interference index values characterizing an approximately 15 dB range of carrier-to-interference ratios considered to be the range of carrier-to-interference ratios which is relevant to making hand-off decisions. A curve was fit to the 30 measured data points, and the curve was used to estimate carrier-to-interference index values corresponding to 256 carrier-to-interference ratios having a spacing of approximately 0.06 dB. The 256 carrier-to-interference ratios and corresponding carrier-to-interference indices were stored in the carrier-to-interference database.

After calculating the short term and long term carrier-to-interference indices for a signal received by the base station, the digital signal processor 200 searches the carrier-to-interference database 300 to determine which stored carrier-to-interference index is closest to the calculated short term carrier-to-interference index, and outputs as a short term carrier-to-interference estimate the carrier-to-interference estimate corresponding to that carrier-to-interference index. Similarly, the digital signal processor 200 searches the carrier-to-interference database 300 to determine which stored carrier-to-interference index is closest to the calculated long term carrier-to-interference index, and outputs as a long term carrier-to-interference estimate the carrier-to-interference estimate corresponding to that carrier-to-interference index. The short term and long term carrier-to-interference ratio estimates are used by handoff control functional blocks (not shown) to determine whether a handoff should be requested.

The digital signal processor 200 also determines the most probable SAT frequency for the received signal by comparing the real and imaginary parts of the first order autoregressive parameters a(n).

The embodiments described above may be modified without departing from the principles of the invention, the scope of which is defined by the claims below. For example, some or all of the digital signal processing functions could be implemented in hardware instead of software or firmware. In particular, most or all of the functional blocks shown in FIG. 2 have hardware implementations.

I claim:

1. A method for estimating carrier-to-interference ratios of signals transmitted between cellular radio base stations and mobile units, the method comprising:

transmitting a Supervisory Audio Tone (SAT) signal from a base station to a mobile unit served by that base station;

receiving the SAT signal at the mobile unit;

retransmitting the received SAT signal at the mobile unit;

receiving the retransmitted SAT signal at the base station;

calculating a first order autoregressive parameter for the received SAT signal at the base station; and correlating the first order autoregressive parameter with a tabulated carrier-to-interference ratio estimate to estimate the carrier-to-interference ratio of the signals.

2. A method as defined in claim 1, wherein the step of calculating the first order autoregressive parameter comprises:

Frequency Modulation (FM) demodulating a composite received signal;

frequency shifting the demodulated signal to center a SAT frequency band of the demodulated signal at a frequency origin;

bandpass filtering the frequency shifted signal to attenuate signal components outside of the SAT frequency band; and decimating the filtered signal to reduce a sample rate of the filtered signal.

3. A method as defined in claim 2, wherein:

the SAT signal has a nominal frequency selected from 5970 Hz, 6000 Hz and 6030 Hz; and the step of decimating the filtered signal reduces the sample rate of the filtered signal to 120 samples per second.

4. A method as defined in claim 2, wherein the step of calculating the first order autoregressive parameter further comprises, calculating a sequence a(n) of first order autoregressive parameters according to:

$$a(n)=a(n-1)-2k\ e(n)z^*(n-1)$$

where e(n) is a sequence of complex-valued filter residuals given by:

$$e(n)=z(n)+a(n-1)z(n-1)$$

z(n−1) is a sequence of complex-valued samples comprising the decimated signal, z*(n−1) is a complex conjugate of z(n−1), and k is a real-valued constant.

5. A method as defined in claim 4, further comprising initializing a(1) at a value selected from −j, 1 and j according to a SAT frequency assigned to the base station.

6. A method as defined in claim 1, wherein the step of correlating the first order autoregressive parameter with a tabulated carrier-to-interference ratio estimate comprises:

calculating a squared magnitude of the first order autoregressive parameter; and correlating the squared magnitude of the first order autoregressive parameter with a tabulated carrier-to-interference ratio estimate.

7. A method as defined in claim 6, wherein the step of correlating the squared magnitude of the first order autoregressive parameter with a tabulated carrier-to-interference ratio estimate comprises:

averaging the squared magnitude of the first order autoregressive parameter over time to calculate a carrier-to-interference index; and correlating the carrier-to-interference index with a tabulated carrier-to-interference ratio estimate.

8. A method as defined in claim 7, wherein:

the step of averaging the squared magnitude of the first order autoregressive parameter comprises calculating both short term and long term averages to generate short term and long term carrier-to-interference indices respectively; and the step of correlating the carrier-to-interference index with a tabulated carrier-to-interference ratio estimate comprises correlating both short term and long term carrier-to-interference indices with respective tabulated carrier-to-interference ratio estimates.

9. Apparatus for estimating carrier-to-interference ratios of signals transmitted between cellular radio base stations and mobile units, the apparatus comprising:

a signal processor for calculating a first order autoregressive parameter for a received Supervisory Audio Tone (SAT) signal at the base station; and a database for correlating the first order autoregressive parameter with a tabulated carrier-to-interference ratio estimate to estimate the carrier-to-interference ratio of the signals.

10. Apparatus as defined in claim 9, wherein the signal processor is operable to:

Frequency Modulation (FM) demodulate a composite received signal;

frequency shift the demodulated signal to center a SAT frequency band of the demodulated signal at a frequency origin;

bandpass filter the frequency shifted signal to attenuate signal components outside of the SAT frequency band; and decimate the filtered signal to reduce the sample rate.

11. Apparatus as defined in claim 10, wherein:

the SAT signal has a nominal frequency selected from 5970 Hz, 6000 Hz and 6030 Hz; and the signal processor is operable to decimate the filtered signal to reduce a sample rate of the filtered signal to 120 samples per second.

12. Apparatus as defined in claim 10, wherein the signal processor is operable to calculate a sequence a(n) of first order autoregressive parameters according to:

$$a(n)=a(n-1)-2k\ e(n)z^*(n-1)$$

where e(n) is a sequence of complex-valued filter residuals given by:

$$e(n)=z(n)+a(n-1)z(n-1)$$

z(n−1) is a sequence of complex-valued samples comprising the decimated signal, z*(n−1) is a complex conjugate of z(n−1), and k is a real-valued constant.

13. Apparatus as defined in claim 12, wherein the signal processor is operable to initialize a(1) at a value selected from −j, 1 and j according to a SAT frequency assigned to the base station.

14. Apparatus as defined in claim 9, wherein the signal processor is operable to:

calculate a squared magnitude of the first order autoregressive parameter; and correlate the squared magnitude of the first order autoregressive parameter with a carrier-to-interference ratio estimate tabulated in the carrier-to-interference database.

15. Apparatus as defined in claim 14, wherein the signal processor is operable to:

average the squared magnitude of the first order autoregressive parameter over time to calculate a carrier-to-interference index; and correlate the carrier-to-interference index with a tabulated carrier-to-interference ratio estimate.

16. Apparatus as defined in claim 15, wherein the signal processor is operable to:

calculate both short term and long term averages to generate short term and long term carrier-to-interference indices respectively; and correlate both short term and long term carrier-to-interference indices with respective tabulated carrier-to-interference ratio estimates.

* * * * *